United States Patent [19]

Moran, Jr.

[11] Patent Number: 4,861,942
[45] Date of Patent: Aug. 29, 1989

[54] ADJUSTABLE RISER ASSEMBLY

[75] Inventor: Thomas F. Moran, Jr., Chagrin Falls, Ohio

[73] Assignee: Midwest Plastic Fabricators, Inc., Chagrin Falls, Ohio

[21] Appl. No.: 210,001

[22] Filed: Jun. 22, 1988

[51] Int. Cl.$^4$ .......................... H02G 3/04; H02G 9/06
[52] U.S. Cl. ........................................ 174/38; 174/48; 285/302; 361/364
[58] Field of Search .................. 174/37, 38, 44, 48, 174/60, 68.3, 71 R, 72 R, 75 B, 79, 81, 82, 86, 96, 98, 100; 361/364–375; 285/302

[56] References Cited

U.S. PATENT DOCUMENTS

| | | | |
|---|---|---|---|
| 2,506,064 | 5/1950 | Christie | 174/38 X |
| 2,900,436 | 8/1959 | Appleton | 174/86 |
| 3,879,641 | 4/1975 | Byrd | 174/38 X |

FOREIGN PATENT DOCUMENTS 63659  9/1927  Sweden .............................. 361/370

Primary Examiner—Laramie E. Askin
Attorney, Agent, or Firm—Pearne, Gordon, McCoy & Granger

[57] ABSTRACT

A riser assembly of rigid conduit is provided for an electrical cable which is adjustable. The riser assembly includes first and second rigid conduits having a telescoping interconnection at an elongated enlarged diameter lower end of the second conduit. This permits the upper end of the second conduit to be connected by a threaded fitting to a meter box and to have the lower end of the first conduit extend below grade to receive an electrical cable. Settling of the ground or thermal expansion is readily accommodated by the telescoping adjustment without any strain on the threaded fitting connection to the meter box.

2 Claims, 1 Drawing Sheet

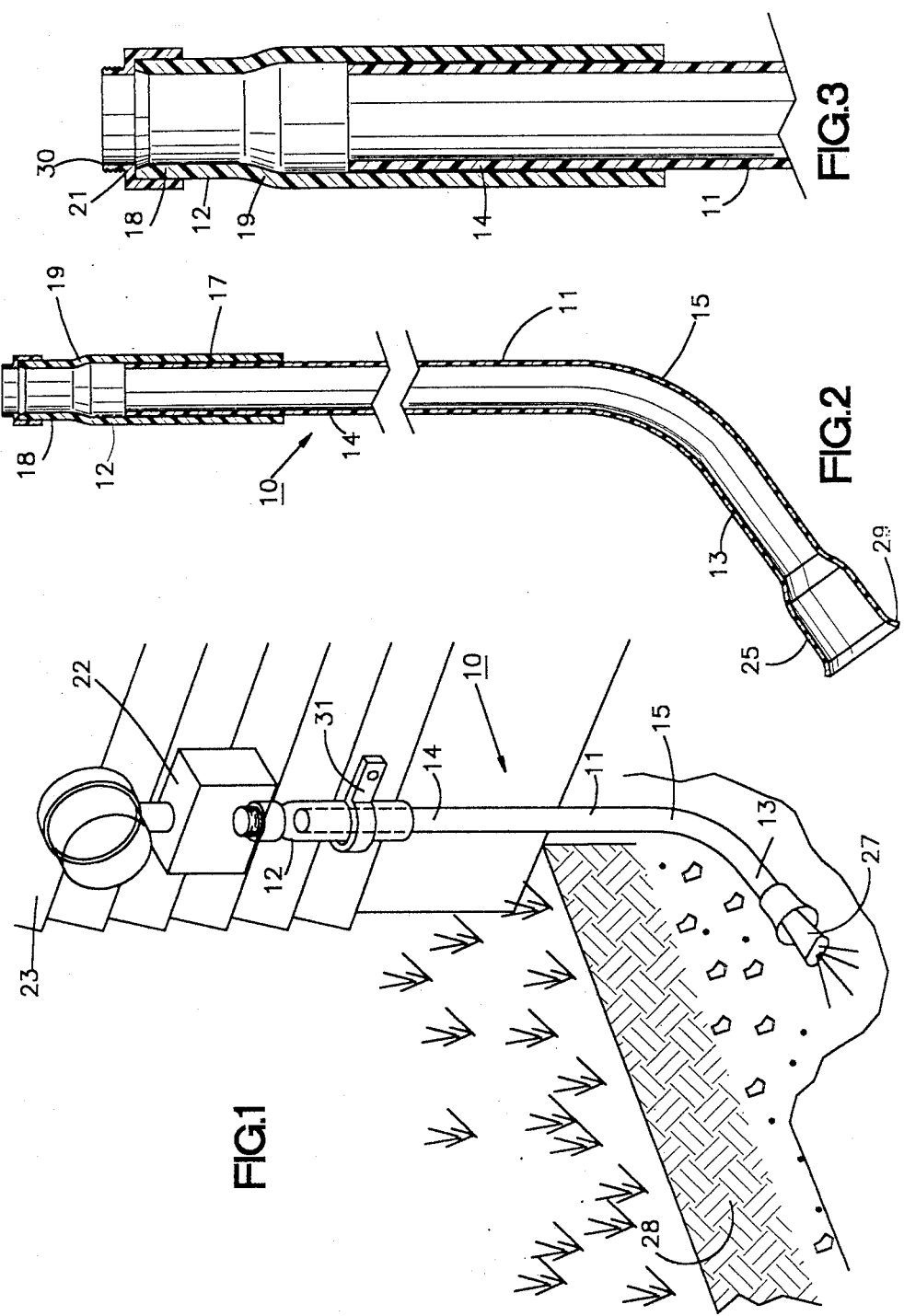

ADJUSTABLE RISER ASSEMBLY

BACKGROUND OF THE INVENTION

Rigid conduit has been previously used as a riser coming from underground and extending above ground to a meter box on an exterior vertical wall of the building. Such rigid conduit riser is used for physical protection of service entrance cable and the like supplying electrical power to either a residential or a commercial building. Quite often, such rigid conduit has an L-shaped bend therein so that the lower end extends generally horizontally into a trench. The trench may extend perpendicular to the foundation or at any variation from 0° to 180°. The riser assembly will accommodate any trench angle extending from the foundation. The trench has previously been excavated so that an electrical cable could be laid therein, either direct burial cable or cable within a protective conduit which could connect to the lower end of the riser. Often, the earth in the trench would settle, and this would place undue strain on the direct burial cable, or the riser, and as a result the terminator fitting between the riser and the meter box could be broken loose. Thermal expansion and contraction with weather changes also caused high stress on such riser and terminator fitting. The riser assembly also accommodates varying meter heights as may be permitted by local codes, e.g., 4-ft. to 5-ft. meter heights are normally acceptable. The riser assembly will accommodate any height from 4 feet to 5 feet while providing adequate burial depth for the cable in the trench to conform with "cover" requirements of the National Electrical Code. In mobile home applications, the riser assembly accommodates settlement of the mobile home without driving the underground conduit up through the service panel.

The problem to be solved, therefore, is how to achieve a riser assembly which eliminates the stress on both the electrical cable and the fitting connection between the riser and the electrical box to which it is connected.

This problem is solved by an adjustable riser assembly comprising, in combination, a first rigid conduit having first and second ends, a bend of at least about 30 degrees in said first rigid conduit between said ends, a second rigid conduit having first and second ends, said first end of said second conduit having an enlarged diameter portion sufficient to receive the second end of said first conduit with a sliding fit, a fitting secured on said second end of said second conduit for connection to an electrical box on a substantially vertical wall of a building, said enlarged diameter portion on said first end of said second conduit being at least six inches long for telescoping adjustment with said second end of said first conduit, said telescoping adjustment establishing a close fitting sliding interconnection between said first and second conduits to accommodate ground settling and thermal expansion for a conduit or a direct underground burial cable leading to the building, and said first and second conduits and telescoping adjustment therebetween providing physical protection below and above ground for an electrical cable within said conduits.

Accordingly, an object of the invention is to provide an adjustable riser assembly which can automatically adjust in vertical height due to any settling of earth in the trench containing the cable or due to any thermal expansion or contraction.

Other objects and a fuller understanding of the invention may be had by referring to the following description and claims, taken in conjunction with the accompanying drawing.

BRIEF DESCRIPTION OF THE DRAWING

FIG. 1 is an isometric view of an adjustable riser assembly in accordance with the invention;

FIG. 2 is a longitudial, sectional view of the riser assembly; and

FIG. 3 is an enlarged, partial longitudinal sectional view of the upper end of the riser assembly.

DESCRIPTION OF THE PREFERRED EMBODIMENT

The figures of the drawing show an adjustable riser assembly 10 which includes generally first and second conduits 11 and 12, respectively. Each conduit is basically a rigid cylinder, and in the preferred embodiment is a non-metallic conduit such as made from polyvinyl chloride or other thermoplastic. The first conduit 11 has first and second ends 13 and 14, respectively, with a bend 15 intermediate the ends. This bend is at least 30 degrees, and may be 45 degrees or 90 degrees, according to the desired use.

The second conduit 12 has first and second ends 17 and 18, respectively. The first end of the second conduit 12 has an enlarged diameter portion sufficient to receive the second end 14 of the first conduit 11 with a sliding fit. In the preferred embodiment, this is an enlarged end having a length exceeding about six inches, and preferably a length of about twelve inches. A physical stop 19 is positioned intermediate the first and second ends 17 and 18 of the second conduit 12, and in the preferred embodiment this is an annular shoulder between the enlarged end 17 and the second end 18, which second end 18 has a nominal inner diameter substantially the same as the nominal inner diameter of the second end 14 of the first conduit 11. This provides a physical stop for the second end 14 of the first conduit.

A fitting 21 is provided on the second end or upper end 18 of the second conduit 12. In the preferred embodiment, this fitting is made from rigid polyvinyl chloride or other thermoplastic, and is secured by a solvent or adhesive to the second end 18. This fitting is preferably a threaded fitting with a male thread to be received in a standard diameter aperture in an electrical box 22. Typically, this electrical box 22 may be a meter box, or may be a service entrance panel mounted on the exterior vertical surface of a wall 23 of a building. The male thread receives a lock nut on the inside of the bottom wall of the electrical box 22 in order to secure the fitting 21 to this box 22.

The lower or first end 13 of the first conduit 11 is in this preferred embodiment provided with an end bell 25 which is enlarged sufficiently to receive the nominal outer diameter of an underground cable or conduit.

OPERATION

The adjustable riser assembly 10 of the present invention provides a rigid conduit riser to an electrical box 22, such as a meter box, for physical protection above and below ground to an electrical cable, such as a service entrance cable 27 shown in FIG. 1. This physical protection is provided for the electrical cable 27 for underground service to the building. To provide such electrical power to the building, a trench 28 is dug from the source of power to the building wall 23. According to some electrical code requirements, this service entrance cable 27 should be buried 18 inches deep if protected in a rigid conduit, and be buried 24 inches deep if it is direct burial cable having no conduit around it for physical protection. If a conduit is provided in an 18-inch deep trench, for example, then the conduit may be mated with the end bell 25 for continuity of physical protection to the cable 27. In such case, a 90-degree bend 15 is preferred so that the conduit in the trench may remain horizontal and need not be bent to meet the end bell 25. Where direct burial cable is used, such as shown in FIG. 1, the bend may be 30 degrees or 45 degrees, with a flare 29 on the end bell 25 to protect the direct burial cable 27 so that no bushing is required to eliminate sharp edges per electrical code requirements. At the upper end of the second conduit 12, the fitting 21 has a rounded edge 30, so that again no bushing is required per the electrical code.

The adjustable riser assembly 10 is put in place and secured to the electrical box 22 by the lock nut (not shown). It is also usually held in place by a clamp 31. The telescoping adjustment between the first and second conduits 11 and 12, respectively, provides up to 12 inches in adjustment of vertical height, e.g., from 48 to 60 inches in height for convenient mounting height of the meter box 22, and with the first end 13 of the first conduit 11 at the required depth, e.g., 18 or 24 inches below grade. The end bell 25 may be used for solvent welding onto polyvinyl chloride rigid conduit underground, where such conduit is used, or it may also be used with metal rigid conduit. If the ground in the trench 28, after filling, should settle one-quarter inch, or one inch or more, the adjustable telescoping interconnection of the first and second conduits easily accommodates such settling without placing any strain on the fitting 21. In the prior art riser assemblies, even as little as one-quarter inch of settling of the earth in the trench could place a very severe strain on the fitting 21, which could separate at the solvent weld with the riser, or, in most instances, pull the meter box off the wall. This required rework, made necessary by the pressure on the terminating fitting, with the expense of the service call to correct such problem. Also, the telescoping adjustment provides a sliding interconnection between the two conduits 11 and 12 for any thermal expansion and contraction with weather changes. This telescoping adjusting provides a raintight sliding interconnection because the large end 17 is pointed downwardly. The interior of the riser assembly is smooth, with no joints of different diameters, and hence the electrical cable is easily fed through the riser assembly into the electrical box 22. The bend 15 in the first conduit establishes that the second end 14 of this conduit may be mounted vertically on the building wall 23 and the first end 13 extends underground in a direction having a horizontal component.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adjustable meter riser assembly comprising, in combination:
    a first rigid thermoplastic conduit having first and second ends;
    a bend of at least about 30 degrees in said first rigid conduit between said ends;
    a portion of the first conduit adjacent said first end being adapted to extend underground in a direction having a horizontal component;
    said first end of said first conduit being adapted to receive an underground electrical cable with or without a conduit;
    a second rigid thermoplastic conduit having first and second ends;
    said first end of said second conduit having an enlarged diameter portion sufficient to receive the second end of said first conduit with a sliding fit;
    a fitting secured on said second end of said second conduit for connection to an electrical meter box rigidly mounted above ground on a substantially vertical wall of a building;
    said enlarged diameter portion of said first end of said second conduit being at least six inches long for vertical telescoping adjustment with said second end of said first conduit;
    the nominal inner diameter of the second conduit adjacent its second end being substantially the same as the nominal inner diameter of the second end of the first rigid conduit so as to act as a stop for the second end of the first conduit;
    said telescoping adjustment establishing a close fitting, sliding interconnection between said first and second conduits to accommodate ground settling, thermal expansion, and other forces and not transmit them to the electrical meter box;
    said first and second conduits when installed with the first conduit having a portion in the ground and a portion out of the ground providing physical protection below and above ground for an electrical cable when within said conduits.

2. An adjustable meter riser assembly in accordance with claim 1, in which there is an enlarged bell on the first end of the first conduit.

* * * * *